INVENTOR.
WILLIAM T. RUSSELL
BY
Stevens, Davis, Miller & Mosher
ATTORNEYS

July 30, 1974 W. T. RUSSELL 3,826,703
METHOD OF PRODUCING FIBROUS SILICATE PRODUCTS
Original Filed July 12, 1970 3 Sheets-Sheet 2

INVENTOR.
WILLIAM T. RUSSELL
BY
Stevens, Davis, Miller & Mosher
ATTORNEYS

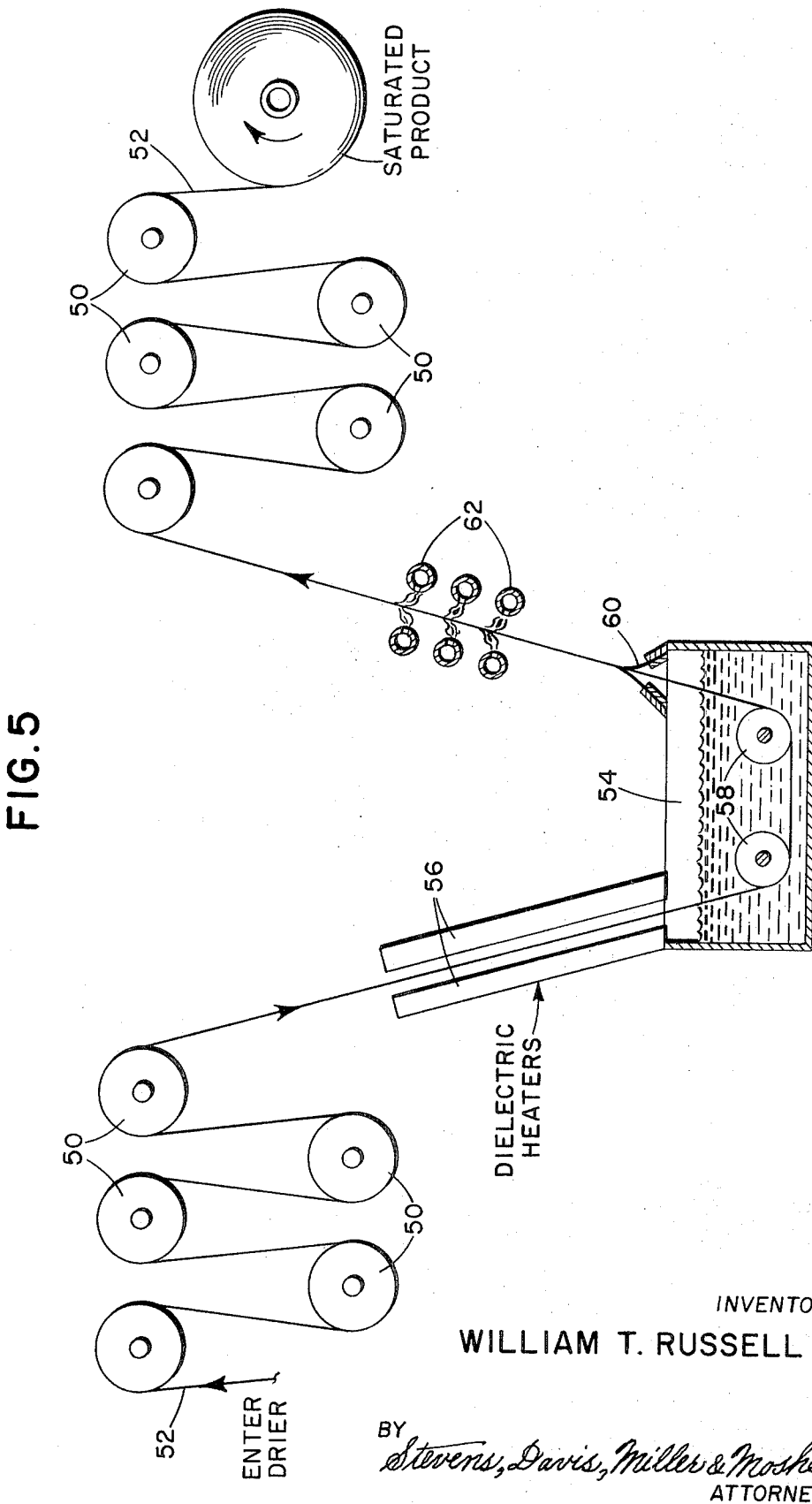

United States Patent Office 3,826,703
Patented July 30, 1974

3,826,703
METHODS OF PRODUCING FIBROUS SILICATE PRODUCTS
William Thornton Russell, Rte. 4,
North Manchester, Ind. 46962
Application July 12, 1970, Ser. No. 55,672, now abandoned, which is a continuation-in-part of application Ser. No. 781,200, Dec. 4. 1968, now Patent No. 3,616,194. Divided and this application May 10, 1972, Ser. No. 252,049
Int. Cl. B05c *3/12;* B31c *13/00;* B32b *13/08*
U.S. Cl. 156—189                                           19 Claims

ABSTRACT OF THE DISCLOSURE

The subject matter of the following specification involves new products comprising alkali metal silicates and a suitable substrate, especially a fibrous substrate such as a strong, dense paper. A wide variety of products in the form of panels, tubes, both round and multisided, containers, such as boxes and drawers for furniture, desks and the like, or formed by shaping and forming in the manner of laminating, for example, by heat and pressure in a press or a combination of press and mandrel. The stock material for the laminating operation in a preferred example comprises Kraft liner board stock as a sheet material in which the alkali metal silicate is present in the voids of the paper from surface to surface as viewed in cross section; and the paper may be fully saturated with the silicate or a selected quantity may exist in the paper randomly in the voids and through the paper as results from the manner of effecting the silicating of the paper stock. The silicated paper stock is produced extremely rapidly by techniques which cause the silicate to penetrate the paper in a surface manner, a particularly suitable technique involving steam displacement of air from the paper followed by exposure to a silicate solution which effects condensation of steam entrapped in the paper voids, whereby a high vacuum is set up in the paper voids. As a result, and together with other control factors, the silicate is found to become a substantially composite surface to surface mass as distinguished from mere surface residence. The silicated sheet is then dried to a water content such that it may be stored without adhesion of adjacent surfaces and yet the silicate of the stock may later be caused to undergo plastic flow, as by heat and/or pressure, in a shaping-forming laminating type of product manufacture. In the shaping-forming operation specifically set forth, the silicate within the stock, with its highly reduced moisture content rendering it possible to produce dry products, undergoes thermoplastic transition and the silicate of the layers of sheet stock superimposed upon each other is caused to merge across the interfaces and becomes united as a continuous mass of silicate existing in the completed product through its thickness. As a result, products which have not heretofore been conceived, and which are comparable or superior in substantially all respects to known construction materials are provided from two of the cheapest known raw materials.

---

This is a division of application Ser. No. 55,672, filed July 12, 1970, now abandoned, which in turn is a continuation-in-part of application Ser. No. 781,200, filed Dec. 4, 1968, now U.S. Pat. No. 3,616,194.

This invention relates to new products which basically comprise alkali metal silicates and a supporting, or reinforcing, carrier substrate such as a paper. The invention relates also to methods and apparatus, and particular individual aspects of such methods and apparatus for producing the new products.

More particularly, the invention is concerned with the obtaining of new silicate-fibrous stock materials which not only are useful as such, but which are capable of utilization in manufacturing a great many useful consumer products, such as boxes, and containers in general, cabinets, drawers, furniture, concrete column forms, truck bodies, and like hollow objects formed with strong jointless corners, viewed as greatly improved over conventional products requiring joinery and fastening methods at corner joints. Further, these new stock materials may be readily laminated into more ordinary shapes including flat panels, round tubes, formed moldings, and in fact into any shape where heat and pressure may be applied to consolidate the mass, either consisting solely of such stock materials or in combination with other materials such as cloth, papers, plastic impregnated or coated webs, wood veneers, hardboards, metal sheets, metal mesh, or metal foils used either as interleaves in the laminated products or as surface material thereon. The possible uses for the new stock materials are substantially unlimited and advantages in many respects are afforded in areas of material cost, labor cost, production volume, and product appearance, strength, and durability.

In the overall, and by way of general outline in reference to a preferred form, the invention involves the provision of a relatively dry sheet material which may be considered as a length of paper containing within its body, i.e., within the void spaces existing within the fibre structure, a quantity of a sodium silicate, for example, the very well known liquid silicate glass described by the formula $Na_2O:3.22SiO_2xH_2O$. Conversely, such sheet material may be considered as a relatively thin layer or body of such silicate material within which, i.e., throughout its thickness, there is an interlocking matrix of fibrous material such as paper stock, for example, as provided by the well known Kraft 42 pound liner stock. This composite sheet stock is employed in compositing-laminating operations to produce the new products. It is also useful as a solid packaged adhesive, especially in joining to other stock materials as in laminating.

In considering the invention, it is important to recognize that the new sheet stock is constituted of two materials, each of which materials is continuous throughout the sheet length, and, more importantly, through the thickness of the sheet. More precisely and significantly, it is most important from the outset to perceive the sheet material as containing the silicate as a surface to surface continuum such that, in viewing the sheet stock in cross-section, such silicate is a single united silicate body. This is not to say that all of the voids between the fibres are necessarily filled with silicate and that all of the fibrous material is fully surrounded by silicate, although such may be the case within the full scope of the invention; rather as a basic concept the invention involves the provision of such silicate in surface to surface continuity within at least a significant percentage of the voids on a more or less random basis as results from the sheet forming process. Optional variations in the forming process effect modifications in the characteristics of the sheet stock. It is not believed that such a sheet material has heretofore been conceived or provided as a useful material. As indicated above, many novel products may be made from this silicate-fibrous stock material; and since both the substrate and silicate are extremely low cost materials, products made from the stock material may be marketed at a greatly lower cost than when made from raw materials heretofore employed.

Silicates have heretofore been applied to paper or similar stock material as a surface coating, or wet adhesive, and perhaps on both sides thereof. Also, the art heretofore has referred to silicate application to a paper stock such that there is some permeation of the silicate beneath the surface of such stock. Such prior materials are unlike the present stock materials in that they do not provide the silicate as a substantially dry and united, surface to surface continuum, and therefore such prior materials are neither within the purview nor scope of this invention. Equally important, they are not capable of serving the objectives of this invention, as will become more apparent in considering the specification. At a later point herein, the methods by which such sheet materials are formed are described. Such methods involve procedural steps and environmental conditions that are highly important to observe and objectively maintain in practicing this invention; otherwise, it is not thought to be readily possible to carry the inventive objects herein into effect in any realistic sense.

It is envisioned that such sheet material may be produced in a continuous manner and collected in dried roll form for subsequent distribution and use; or it may be laminated immediately into useful end products. In mentioning the production of laminated products from the dried silicated sheet material it is appropriate at this point to indicate that in such operation there is created a relatively thick composite stock which itself comprises, or embodies, the similar, in fact, essentially the same dual continuum of silicate and paper or the like fibrous stock. It has been discovered that such continuum results, or can be brought about, by heat and pressure which is effective in operating upon the heretofore little appreciated and, apparently, the totally heretofore unemployed thermoplasticity properties of the alkali metal silicates. More specifically, it has been discovered that when a plurality of superimposed sheets of the above described silicated sheet material are placed under heat and pressure, each to a suitable degree, there occurs a plasticizing effect from the heat and a flowing together or melting of the silicate at the surface of each of the superimposed sheets, thus resulting in the complete solid compositing of the sheets so that they no longer exist as such, insofar as the silicate is concerned. The silicate is cuased to merge and leave no perceivable interface at the surfaces of the individual sheets.

The production of such composited materials has resulted in the bringing to light of a variety and combination of very important intrinsic attributes of the silicates of which little or no advantage has been taken heretofore. For example, while the good compressive strength and bonding ability of silicates have been frequently applied in practice, herein the natural thermoplastic character is employed to obtain "dry welding" and thermoforming behavior. Additionally the peculiar thermally responsive electrical resistance property of the silicates, heretofore little appreciated academically, and evidently not at all practically, may be employed to generate needed process heat within the products and/or to detect and thus control heat and moisture in processing steps. Further, herein the natural resistance to fire is utilized to permit high heats for quicker processing, and the attribute of being instantly and reversibly adjustable through the ranges of viscosity and plasticity and solidity is employed throughout the process steps by control of the heat and water variables; and certainly the low cost and availability characteristics of silicates are most significant herein.

To gain a more practical appreciation of those attributes as employed, perhaps some comparisons with older technology are helpful. Wet processes of gluing or casting fibrous webs, mats, or boards inevitably involve one or more serious problems of residual fibre stresses, shrinkage, warping, and wasted time in drying cycles. Thermoplastic resin systems used in comparable circumstances with fibrous webs involve one or more serious problems of flammability, high cost, expensive toxic solvents, lack of sufficient strength or hardness either owing to inadequate saturation or the weakness of the material itself. Thermosetting resin systems used in comparable circumstances with fibrous webs involve one or more problems of expensive toxic solvents, flammability, difficulty of preveting premature cure, wasted time in press equipment waiting for polymerization to occur, and high cost. And whereas simple resistance heating of silicate itself can provide instant heat generation within the products as needed, all alternative systems must depend upon essentially slow and/or expensive introduction of heat from outside sources. In summary, the silicated sheet stock and products made therefrom are more fireproof and they may be produced more rapidly and at a far less cost than in using similarly employable materials. Further, the peculiar silicate thermoplastic character of the sheet stock permits fabrication of boxes, drawers, containers and many other products by mandrel-molding or shape forming techniques, thus avoiding costly milling and subsequent putting together of milled pieces as is usually done in making such products.

In the course of making this invention, it has become apparent that the mere conception of or desire for such products (though no such conception or desire is thought to have existed heretofore) does not automatically or easily beget a process by which they may be brought into being. One of the basic problems arises from the selection of hard, dense, strong papers as substrate and it is difficult to effect surface to surface flowing or penetration of the silicate into or within such a suitably dense paper stock. One reason for difficulty is that when silicate is applied to paper, the paper ordinarily leaches sufficient water from the silicate to increase viscosity of silicate at the interface, thus forming a resistant barrier to further penetration. Not only is surface to surface penetration very difficult to accomplish, but as a practical matter it needs to be accomplished rapidly and with minimum dilution of silicate solution so as to deliver sufficient silicate solids into the paper and in order that drying of the stock is readily accomplished. Moreover, drying of a fully silicate-penetrated substrate involves inherent problems due to the tendency to form a surface layer or crust of solid silicate which occurs upon exposure to drying air and acts to seal the interior against moisture escape. It is important that excess water be removed, and in a rapid and controlled manner. Briefly, moisture should be removed to a content approximating equilibrium with normal ambient room conditions, or to lower moisture levels to prevent "blocking"; otherwise the sheet stock when collected in roll form, or as stacked sheets, will undergo surface to surface adhesions due to the natural adhesive properties of the silicate materials. This undesired adhesion occurs either under the pressure exerted by tightly wound paper, the weight of the roll itself and/or moisture absorption. The higher the water content of the stock and the higher the ambient storage temperature, the more readily adhesion takes place. In preferred practice according to this invention, in preparing stock for interim storage, the silicate in the paper following drying is selected in the range of 63% to 75% solids content. Further, if rapid drying is done in uncontrolled humidity chambers, blistering and internal splitting of the paper substrate along its width and length occurs owing to internal steam pressure and outside crust and results in a highly inferior or useless beginning stock material.

Referring to the problem of effecting surface to surface penetration of the substrate, for example, paper, this invention involves the discovery that it is important to displace air contained in the voids of the paper and highly desirable that the paper fibres be initially moistened, immediately following which, i.e., especially before air is allowed to return to the voids, the substrate should be exposed to the silicate saturant solution. According to the preferred practice described herein, this is accomplished by leading the substrate into a first zone where steam is caused to pass into the voids and, in so doing displace the air and moisten the fibres. The thus steam containing and moistened substrate is then led or transported into an inter-connecting zone containing the silicate solution, at a relatively lower temperature the substrate being submerged therein. The steam condenses, creating a high vacuum which effectively draws the silicate into the paper, the water of condensation becoming a part of the silicate solution or perhaps the fibres as well. As above indicated it is very helpful in effecting penetration if the fibres are moistened, apparently because moistened paper does not quickly denude the silicate of its water content, which denuding causes the aforementioned solid silicate barrier formation. Additionally, the paper is heated by the steam and it does not tend to increase the silicate viscosity by chilling. It is concluded that problems of the above indicated nature have been strong factors in postponing the obtaining of materials and products as herein described.

For reasons not entirely and certainly understood, the silicate which is picked up in the "saturating" operation may not always provide a sufficiently continuous surface coating in dried state. Therefore, before the stock is dried (or after, if preferred) it is preferable to lead it thru a second silicate bath.

Following the impregnating operations including preferably the final coating step, the treated stock is dried in any suitable fashion to the desired water content. It will be understood that optimum or even substantial commercial realization upon this invention involves enormous quantities of such treated stock; thus it is desirable that highly efficient drying technique be employed. Direct flame, not air, and/or radiant heat drying is satisfactory, the humidity being maintained relatively high so that the tendency to rapid surface drying is reduced. As aforesaid, if the silicate forms a skin at the surfaces, moisture is trapped interiorly and the product is made more difficult to dry and make uniform. Drying may be accomplished electrically in a rapid and uniform fashion, the stock material being made the resistance element in the circuitry. In this method it is desirable to preheat the stock material since the resistance of the paper-silicate-water system drops greatly with increase in temperature. For example, in the case of a 65% solids solution of $Na_2O:3.22\ SiO_2$ the drop is extremely sharp in an order of magnitude of 1000:1 in the temperature range of about 20°–100° C. and continues to drop with higher temperature. Consequently voltage and current levels require to be adjusted in accordance with the temperature and moisture of the sheet in order to avoid charring.

Following drying, the sheet stock is ready for storage in roll or sheet form, or further use as in the laminating-compositing operation referred to above.

With regard to the use of the sheet stock in forming thick composite products it will be appreciated that the silicate therein is dry to the touch and not sticky at normal ambient conditions. Accordingly, in order to effect the desired end-result of producing a relatively thick stock or article in which the silicate is present as a continuum, conditions during compositing must be such that the silicate will flow. In the method of this invention it is desirable if not essential that the temperature be limited to below the boiling point of water because the composite sheets contain sufficient water to generate steam inside the product and thus destroy or seriously damage it when external pressure is removed. The laminating-compositing operation is carried out under pressure and heat conditions sufficiently high to cause silicate flow in and between the several layers of sheet material and to effect the desired compaction of the separate layers. This is possible in the present invention since any useable silicate will result in sufficient plasticity at a temperature below 200° F., unless the stock is overdried. In other words, these silicates are not strictly rigid in such temperature range and with pressure they may be deformed or caused to flow, although in the context of this invention there is substantially no useful flow under normal temperature and pressure.

From the foregoing, it should be understood that the compositing operation involves conditions intended and calculated to induce true plasticity in the silicate by the effect of heat and pressure. This operation does not involve drying as a specific necessary objective. As will be appreciated, drying, or reduction of water content, may be effected to any desired and suitable extent in the previous drying operation. It will be recognized that as water content is reduced, plastic flow properties change in relation thereto. Within the invention it is envisioned that water content of the stock material may be as low as is consistent with operable plasticity factors existing in the particular silicate system selected for use in the process and products. Another factor in the compositing operation depends upon pressure, that being the matter of effecting and maintaining the desired compression of the fibre-silicate body. The sheet material as formed presents irregular surfaces resulting from the fibrous content of the stock, and there appear to be one or more mechanical force systems inherent in the stock which oppose compression and which, even after compression release, tend to exert an elastic memory type of effect resulting in loss in the degree of compacting due to return to a state of repose. It is recognized that such occurrences are desirable to take into account since in some measure they are foreseen as capable of disrupting the extent of continuum which is established by pressure. Therefore, sufficient pressure is desirable to the end that temperatures may be lower, which lower temperature affords the advantage of higher cohesive strength in the silicate, absent pressure. Thus, when pressure is released, and despite fibre counter forces, compaction is retained to a significantly higher degree, apparently by reason of opposing silicate strength which immediately comes into operation upon pressure release. As should be appreciated from the foregoing, compaction is quite important in relation to product properties, especially strength and density. Good unification at the interfaces is hindered unless the fibres are intimately compacted; and, unless such unification occurs, cleavage surfaces remain at the interfaces, resulting in a weak product.

Pressures in the range of about 100 to 1000 p.s.i. or higher are found to be suitable, specific desired pressures being related to product density, pressing temperature, and moisture content of the silicate, both latter factors affecting plasticity. In practice, moisture content preferably is held rather closely to a constant. Accordingly, the optimum temperature and pressure condition in relation to particular silicates is readily established.

The soluble alkali metal silicates as a class, mixtures thereof, ternary systems, i.e., substances, such as sodium-lithium silicates, are applicatble in practicing the invention. It is suitable to employ materials in the range of about 2–5 $SiO_2:Na_2O$, such being, in the main, readily available. As higher siliceous ratio materials become available, they also may be employed. Viscosity of such materials are known to increase with increasing siliceous content and solution solids content may be adjusted according to specific impregnation, drying and compositing conditions adopted in practice following the teaching herein. The quantity of such silicates desirable to include in the stock is directly related to the extent of saturation and the concentration of saturant silicate solution. According to this invention, selection of concentration is determined according to the ultimate desired density strength, and hardness of the end-product, e.g. in a range resembling soft woods to twice the hardness of hard maple. Thus, in practicing the invention a low density, yet sufficiently strong product in view of intended use, may be obtained by employing more dilute solutions and impregnating, i.e., saturating, the paper stock to such extent as necessary. Heavy duty materials requiring higher strength characteristics may be obtained by employing more concentrated silicate solutions, and effecting increased saturation. As will be appreciated, many generally similar but specific sets of conditions involving variation in silicate concentration and degree of saturation may be selected according to the desired objective.

In a given impregnation operation, the extent of saturation depends upon several factors, including paper density, thickness, porosity, the particular silicate and its viscosity at the applied temperature, which of course is related to its dilution, residence time of the paper in the solution and pressure if such is employed.

Thus, changing any one of these conditions will have at least some effect on the end product.

Especially useful products are found to be obtained containing from about ¼ pound to 1 pound of silicate per pound of paper stock, such determination being made while regarding the silicate as a solution containing about 68% solids by weight, as such solution exists in the dried paper stock material. This silicate to paper weight relation is easily determined in the stock material by weight measurements made thereon following drying, and the extent of drying can easily be detected by electrical conductivity values related to stock samples prepared under carefully controlled conditions to provide standard reference data.

The invention is more specifically illustrated in the discussion which follows in relation to FIGS. 1, 2, 3, and 4, wherein, FIG. 1 is a somewhat schematized illustration of the steaming, silicating and drying operations;

Figure 1:
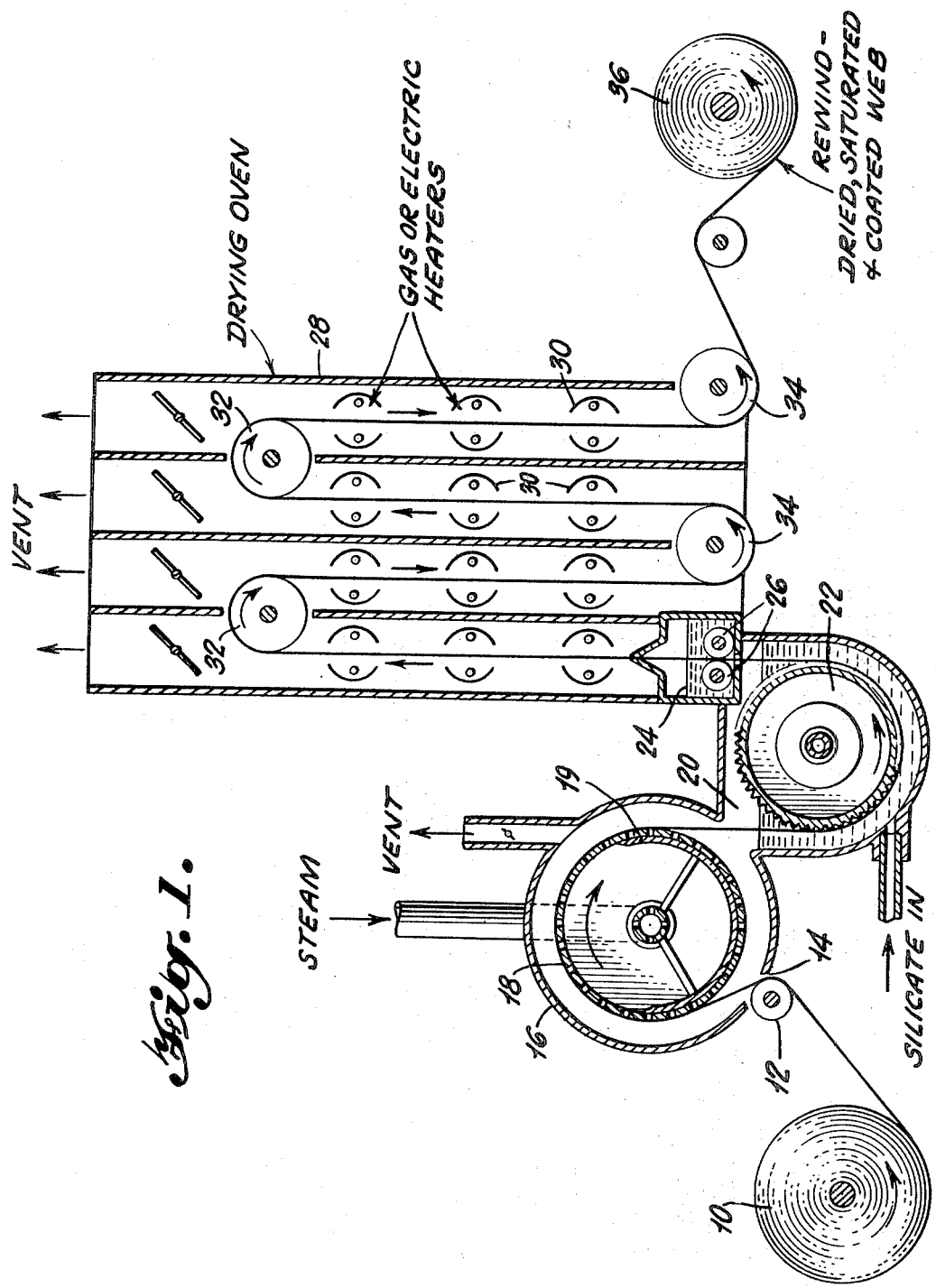

Referring to FIG. 1 showing the steaming, silicate applying and drying apparatus, numeral 10 denotes a mill roll of 42 lb. Kraft liner board paper rotatably mounted for delivery to the processing equipment. The paper is led over a guide roller 12 thru narrow slit 14 in cylindrical shroud 16. Numeral 18 denotes a perforated steam drum around which the paper is led and then immediately being led into the silicate saturating zone. Low pressure steam is delivered to the inside of drum 18. Pressure of the steam causes the steam to pass thru the paper and in so doing, replace or displace the air contained in the voids, or interstices, of the paper. The effluent air and excess steam are vented. The path of travel of the paper during steaming is about two feet in machinery designed for paper moving at about 40 ft./min.

As will be seen, the steam zone connects directly to a second zone 20 containing the silicate solution. The two zones are in direct communication and the paper is therefore not exposed to air.

Zone or chamber 20 contains a well-known sodium silicate solution, $Na_2O:3.22 SiO_2$, the solution being 38.3% by weight silicate solids, weighing 11.67 lbs./gal., and having a viscosity of 206 centipoises at 20° C. The silicate is hot but its temperature is not allowed to rise above about 180° F. so that steam condensation takes place in the voids of the paper upon entry into the solution.

Drum 22 is rotatably mounted and has corrugated surface pattern so that there is a supply of silicate solution on both sides of the paper at all times.

The paper is led into the silicate around drum 22 at the aforesaid speed of about 40 ft./min., the silicate path being about two feet in length, during which time the paper is permeated surface to surface thru its thickness.

Numeral 24 denotes a second silicate application zone containing preferably more viscous silicate thru which the paper is led, between spreader rolls 26, at which time the aforementioned outer surface layers of silicate are applied to both sides of the paper stock.

Numeral 28 denotes a drying oven containing gas or electric heaters 30 adjusted to provide a steady heat of about 500° F., and effluent vents are adjusted to control humidity. It is desirable to maintain a high level of humidity in the drying oven so as to aid in preventing crust formation on the paper surface. This is readily accomplished by adjusting the vents seen at the top of the oven so that steam, which is generated from the water content of the paper, is held in the zone in the desired quantity.

In this operation, both temperature and drying residence time (length of drying path and/or rate of stock movement) may be varied. The paper is led thru the drying path, which is about 80 ft. in length, alternately over rollers 32 and 34. In passing thru the drying zone, water content is lowered at least to room dry conditions represented by 50% relative humidity —70° F. Electrical conductivity measurements are made to detect moisture content of the paper by means not shown, the values obtained being compared against standards for conductivity at the desired standard conditions.

The paper stock is then dried and may be stored in roll form, as at numeral 36. The dried silicate in roll 36 has been reduced in water content to about 30%–35%. It is found that it is relatively stiff and somewhat brittle and can accept the pressure inherent in the mass of the roll, without sticking at the paper interfaces. However, with later steaming to provide heat the sheet stock can readily be made plastic as it is unrolled. Thus, the sheet stock is a convenient dry adhesive package for use in any laminating or surface joining operation without the need for water or pre-spreading of the adhesive.

Figure 2:
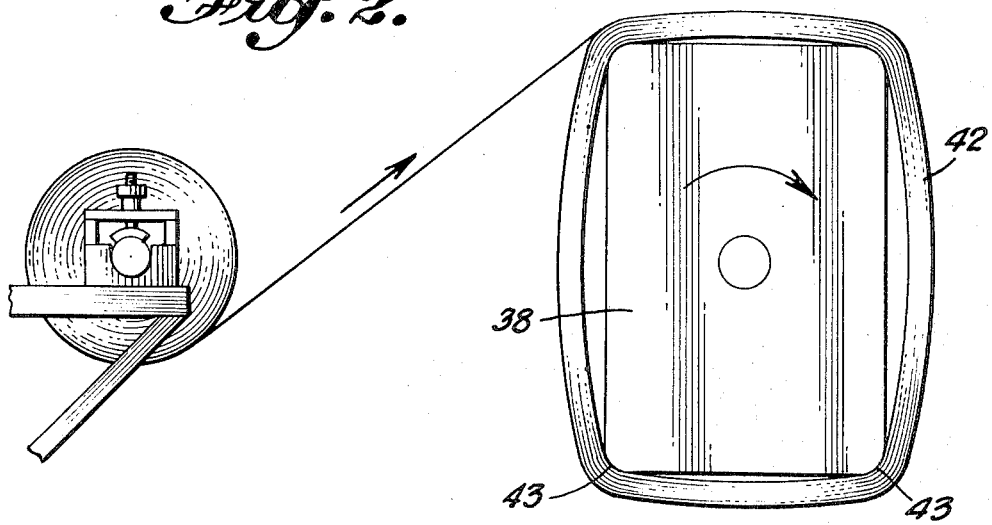
FIG. 2 illustrates a step and apparatus in one process of laminating-compositing-shaping products.
Figure 3:
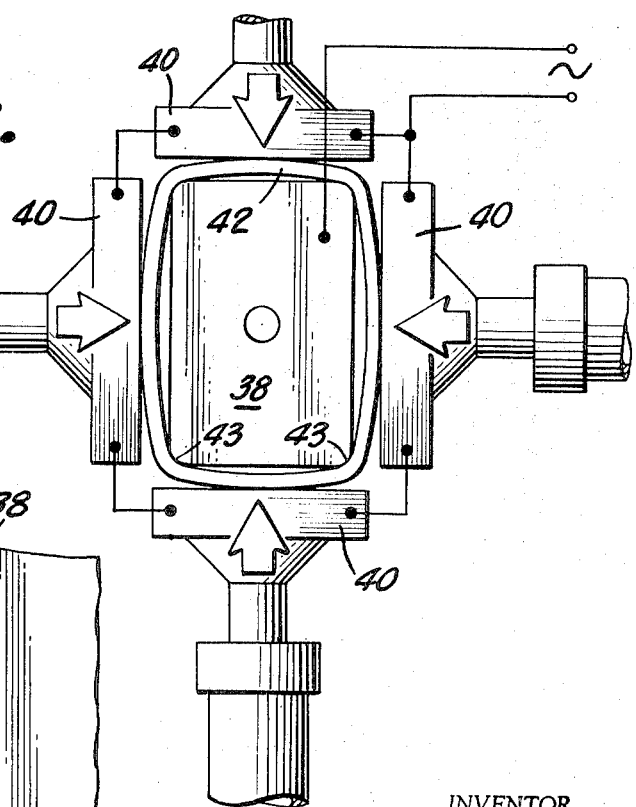
FIG. 3 illustrates a press and mandrel apparatus employed in the laminating-compositing-shaping operation.

Referring to FIGS. 2 and 3 there is seen a schematicized showing of a mandrel-press, in which composited products are made. As will be seen, there is a central, rectangular mandrel 38 and four (4), press members numeral 40, about the periphery of the mandrel, each being adapted to apply pressure equally relative to the mandrel and the paper stock 42 wrapped thereabout. In use, the silicated stock, heated to about 140° F. is wrapped tightly about the mandrel, the mandrel being rotatably mounted and drawing the sheet stock either from roll 36, or directly from the dryer, and winding a product wall thickness as desired, e.g., about one-half inch (see FIG. 4). The mandrel is then moved into position between the presses. Pressure is applied by each at about 300 p.s.i. and heat is delivered simultaneously to the sheet stock sufficient to raise its temperature to about 180° F., whereupon no further dwell-time is required and pressure may be released. Although press platens 40 may be internally heated, heat is created within the plies of sheet stock most readily by passing about 150 watts per square inch of alternating current through the entire product assembly considering mandrel 38 as one pole and press members 40 to be the other pole of the circuit. Considerations of total electric heating load of the product can be closely estimated on the basis of .42, specific heat and it is not intended that any evaporative load should occur.

Although the process is not so limited, the product which is formed here is generally rectangular and in the form of the sidewalls of a cabinet drawer. If desired the bottom for the drawer may be simultaneously affixed within the said four walls. This is readily accomplished by holding a flat panel piece on the top side of the mandrel, the panel being very slightly larger than the mandrel, and allowing the wound paper stock to extend beyond the mandrel and overlap the edges of the panel. The panel in position on the mandrel, a flat steel sheet, similarly sized and shaped as the mandrel is then placed over it to provide bearing surface for the press of the sidewalls, the panel stock affording bearing surfaces along its periphery. When heat and pressure are applied, the bottom piece "welds" securely into position and a complete drawer or other box shape is thus provided.

Figure 4:
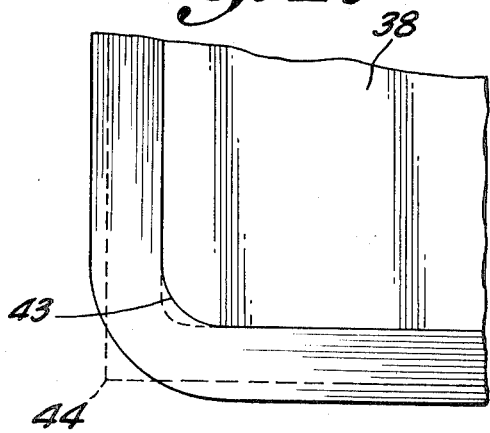
FIG. 4 illustrates a feature of the mandrel apparatus.

Referring to FIG. 4, reference numeral 43 denotes the corners of the mandrel 38 which is of simple solid construction, i.e., not collapsible. As will be seen, the corners are rounded. It has been discovered that there is great advantage in so constructing the mandrel for the reason that the composited material easily releases from the mandrel. Release from a solid mandrel having square corners is extremely difficult, if not impossible without damage to the product and in fact damage occurs during pressing owing to crowding at the corners. By way of further explanation and description, as will be appreciated upon reflection, and as shown in the drawings, when a paper is wrapped upon a rectigular mandrel, the paper assumes a slightly outward curve (exaggerated in the drawing) relative to the mandrel side surfaces. This is always the case, even though the paper layers are proportionately slightly longer than the adjacent mandrel surface. Additionally, it is readily appreciated that a paper at the point of turning the corners is extremely tight against the corners. It is found that when the mandrel corners are properly rounded, the paper adjacent thereto is caused to move away under the action of the applied press pressure and thus automatically form a square outside corner on the product. A showing of this is seen in FIG. 4 at numeral 44. Rounded outside corners on products are equally easily achieved by increasing the size of radii on mandrel corners. In the press, the arc in the wound paper along the mandrel sides is flattened and the paper then is caused to extend away from and beyond the corners of the mandrel, thus releasing the extremely tight corner frictional holding. When the product is ready for removal, it slips easily away from the mandrel. This is not found to be possible with square cornered mandrels, which will neither promote easy release, nor provide for the proper amount of material to be present in the corner of the finished product. It is believed that for lack of understanding of the functions here described, atttempts to form square or rectangular products, practical, simple mandrels have not been pursued by the art.

The method of silicating a substrate according to this invention is applicable to a wide variety of stock materials both thick and thin. Thus a thick paper board for example ¼ inch or more may be similarly "saturated" or permeated through its thickness, with functionally similar apparatus but differently laid out. However, it will be appreciated that longer processing time for each step will be required, especially if steam pressure is constant, or silicate viscosity is not lowered. Such a permeated board may be for example tunnel dried and then compacted to the desired density in any suitable manner.

Teh substrate may be of natural fibres such as cellulose in paper, synthetic fibres, glass fibres, metal fibres or various mixtures thereof. However, as indicated above, preferably, the substrate should have good multi-directional strength in order to provide a well reinforced product, and to process well in the wet state.

The foregoing material is the content of my prior application of which this application is a continuation-in-part. In presenting this continuing case, it is with the desire to point out additional useful technology.

In my prior application, it was disclosed that electric heating may be employed to effect plastic flow, or thermoplasticity, of the silicate in the laminating-compositing operation. It is desired to point out herein specificially that known dielectric type heating equipment may be employed. Moreover, such may be employed at any point in the operation if desired, economics being the controlling factor.

It is also desired to point out that the silicate saturating operation herein described may be integrated with paper manufacturing machines, the paper being passed through the silicate solution at a point when the paper is nearing the end of its drying stage on the paper machine. In such type of integrated operation, it is advantageous to effect saturation by employing dielectric heating to the damp paper stock whereby some of the excess water in the paper is converted to steam and air is expelled due to steam displacement. Of course, the paper is immediately passed to the silicate solution prior to internal steam condensation so as to be able to develop high vacuum in the paper stock, as in the foregoing described saturating technique. The silicate saturating step in a paper machine operation is accomplished by diverting the paper from a drying roller in its normal drying travel path into a tank of silicate solution and then returning it to the next succeding drying roller where it is dryed as usual, or as may be desired for purposes of this invention. Dielectric heating of the paper stock is advantageously employed just prior to the entry of the paper into the silicate solution.

FIG. 5 is a diagrammatic illustration of the dryer section of a conventional paper machine. In this figure, numeral 50 denotes the drying rollers and numeral 52 the travelling paper. Numeral 54 denotes a vat or tank of silicate solution. Numeral 56 denotes a dielectric heating unit through which the paper travels into the solution and around roller 58. Numeral 60 denotes a wiper across which the travelling paper passes as it leaves the solution in order that excess surface-carried solution is removed before reaching the drying rollers. Numeral 62 is an open gas flame unit situated relative to the paper such that the silicated paper surface is exposed to direct flame contact. For reasons not entirely understood, such direct flame contact tends to drive surface silicate into the paper web. One would perhaps suppose that the direct flame contacting would bring about immediate silicate "skinning" at the paper surface due to moisture removal from the surface silicate; however, such does not appear to be the case. The wiping and flame contacting units are not essential, but they are preferable especially in high speed operations.

The silicating step is suitably integraed into the paper making operation at a time when the paper is still moist, for example, containing not less than sufficient water that the silicate is robbed of water by the paper, which results in the formation of solid surface silicate and poor penetration. The exact point of paper take-off is not critical; however, it is desirable to take the paper to the silicate solution containing not less than about 8–10% water. More water than this is readily tolerated. For example, as much as 20–30%, or much higher up to the point where the paper seriously begins to have little strength, and breakage thus results in the paper travelling operation. As will be understood, the subsequent drying and taking up of such silicated stock is completed entirely similarly to the foregoing description.

It will be apparent that the silicating step may be employed in conjunction with the normal paper making operation as desired, since only a few minutes time are required to reroute the paper to the silicate vat, or similar or less time to return to the normal paper making operation. Teflon coated, or sleeved rollers, obviates any troublesome problem which otherwise might arise by reason of roller fouling by the silicate solution tending to adhere to the rollers.

When paper of, for example, about 15% moisture content is diverted for the silicating operation, it comes from the drying rolls at a temperature of about 180° F., and it is hot through its thickness, although perhaps not entirely uniformly. The voids therein have attained an air-water vapor pressure relationship characteristic for such a system at that general temperature in open air. In order to provide optimum conditions within the paper so as to effect good saturation, it is important that the air to steam-volume (or partial pressure) relationship which exists in the voids upon entry to the silicate solution be one such that the least possible amount of air be present in the voids. In order to accomplish this, it is desirable to generate steam in the paper, particularly in the interior as distinct from mere surface heating, at a very high rate, suitably at a rate as high as possible without causing explosive damage to the paper from interior flash generation of steam. This aspect of the saturating process is well served by dielectric type heating (which also is here intended to include higher frequency microwave heating) because of instantaneous heat generation deep within the paper at the same or higher heating rate as on the exterior. Consequently, the greatest possible amount of air (all for practical purposes herein) may be displaced by the rapid steam generation. Then when the steam content of the voids is condensed therein within the saturant, the pressure (vacuum) change is very great.

It should be borne in mind that dielectric heating is ineffective upon air or gaseous media, i.e., air cannot be thus heated. Therefore, it is desirable to heat the ambient atmosphere immediately adjacent the paper, especially in the area just prior to entering the vat, in order that possible heat loss to the surrounding atmosphere will not result in premature steam condensation within the paper. This may be accomplished in a variety of ways, for example by directing live steam onto the paper. Steam has the further advantage of scrubbing the paper free of surface air which tends to be occluded or otherwise attached to the travelling paper surface.

It will be appreciated that the manner of effecting saturation employing dielectric heating for creation of the needed internal vacuum may be employed in the process of my prior parent application, the paper, of course, being first suitably wetted.

Further, it should be appreciated that the teachings herein relative to effective saturation of paper with silicate are applicable to the saturation of paper or similar substrates with other materials, either in conjunction with a paper making machine or otherwise. Thus, various resinous materials may be similarly and thoroughly drawn into a moist paper stock, the moisture, of course being supplied for the purpose of steam generation in the voids as herein described.

Thermosetting resins such as urea- and phenol- formaldehyde resins, and melamine resins, and any thermoplastic resin may be introduced into a substrate in the manner described above.

In using the term saturated, saturating and the like herein, such is not intended necessarily to indicate complete saturation. Rather, these terms include complete saturation, but also contemplate surface to surface penetration in a more or less random manner, as indicated in my prior parent application.

What is claimed is:

1. A process for producing a silicate stock material comprising a relatively dense fibrous substrate of substantial multi-directional strength impregnated with a soluble sodium silicate wherein the $SiO_2:Na_2O$ ratio is at least about 2:1 and wherein said silicate, including associated water content, is present in at least about ¼ pound per pound of said substrate, said process comprising passing steam through said substrate such that air therein is substantially replaced by steam; while said steam is still present in the vapor state, passing said substrate directly into a body of said silicate in the liquid state so that said steam is condensed in said substrate and said silicate is induced under the force of the resulting vacuum to enter the voids of said substrate and reside therein as a surface to surface continuum; thereafter removing said substrate containing said silicate and reducing the water content thereof at least (1) sufficiently that the thus treated substrate is capable of being handled or stored under ambient conditions without the occurrence of activation of the natural adhesive or plastic properties of said silicate and (2) sufficiently that the thus treated substrate may be employed in a pressing operation as a plurality of layers in the formation of dry, composite, dimensionally stable products under the effects of heat and pressure.

2. A process for producing a silicated fibrous stock material from a fibrous substrate of substantial multi-directional strength and a solution containing sodium silicate having an $SiO_2:Na_2O$ ratio of at least about 2:1 which comprises contacting said substrate with steam, thereby displacing air in said substrate and moistening the fibres therein; contacting said substrate while still denuded of air with the silicate solution, said solution being at a temperature sufficiently low to effect condensation of steam and resulting low pressure conditions within said substrate; continuing silicate solution contacting for such time as to load said substrate with said solution to at least about one-fourth pound per pound of substrate as calculated following drying thereof and including the remaining associated water content; drying the thus silicated fibrous substrate to a water content such that the silicate thereof is non-adhesive and non-plastic under contemplated handling and storage conditions.

3. A process as claimed in claim 2 wherein said substrate is a dense strong paper of the character of Kraft liner board stock.

4. A method for producing a dry, composite, silicated fibrous product from dried silicated fibrous sheet stock, said sheet stock comprising a relatively dense fibrous substrate of substantial multi-directional strength impregnated with a soluble sodium silicate wherein the silicate is present between the fibers as a surface to surface continuum, said silicate having an $SiO_2:Na_2O$ ratio of at least about 2:1 and said silicate, including associated water content, being present in said sheet stock to the extent of at least about ¼ pound per pound of fibrous substrate, said method comprising subjecting a plurality of superposed layers of said sheet stock to plasticizing conditions of heat and pressure such that the silicate in adjacent layers is caused to undergo plastic flow and merge together and thereby effect substantial silicate continuity through the thickness of said product, and allowing said silicate to solidify.

5. A process as claimed in claim 4 wherein the said heat is supplied internally of the products undergoing formation by electrical resistance heating, the said layers constituting the resistance element of the applied circuitry.

6. A process as claimed in claim 4 wherein an outer surface layer of sodium silicate-containing solution is present on at least one side of said silicated substrate in addition to the silicate between said fibres.

7. A method as claimed in claim 4 wherein said products are produced in a shaping operation wherein the said sheet stock is wound upon a mandrel and said pressure conforms said sheet stock to the mandrel.

8. A method as claimed in claim 4 wherein the fibrous content of said sheet stock comprises cellulosic fibers.

9. A method as claimed in claim 5 wherein the fibrous content of said sheet stock comprises cellulosic fibers.

10. A method as claimed in claim 6 wherein the fibrous content of said sheet stock comprises cellulosic fibers.

11. A method as claimed in claim 7 wherein the fibrous content of said sheet stock comprises cellulosic fibers.

12. A method as claimed in claim 4 wherein the said sheet stock is paper of the character of Kraft liner board stock.

13. A method as claimed in claim 5 wherein the said sheet stock is paper of the character of Kraft liner board stock.

14. A method as claimed in claim 6 wherein the said sheet stock is paper of the character of Kraft liner board stock.

15. A method as claimed in claim 7 wherein the said sheet stock is paper of the character of Kraft liner board stock.

16. A method of forming shaped composite silicated fibrous products which comprises passing a dense fibrous sheet material having substantial multi-directional strength to a first zone where air entrapped between the fibers is displaced to a substantial degree by the application of steam; passing said sheet material to a silicating zone containing a solution of a sodium silicate having an $$SiO_2:Na_2O$$

ratio of at least 2:1 maintained at a temperature sufficiently low that steam in said sheet material is condensed; retaining said sheet material in said silicating zone for a time sufficient to internally load the said sheet material to a silicate content, including the remaining associated water content, of at least ¼ pound per pound of sheet material following drying; drying said silicated sheet material sufficiently that it does not exhibit active adhesive or plastic flow properties under ambient conditions passing said dried silicate sheet material to a compositing zone wherein it, as a plurality of layers, is subjected to plasticizing conditions of heat and pressure such that the silicate at the surfaces of adjacent layers undergoes plastic flow and merges to provide the silicate in said products in surface to surface continuity through a substantial proportion of the void spaces between the fibers of the composited product.

17. A method as claimed in claim 16 wherein said silicated sheet material is provided with an outer layer of alkali metal silicate on at least one of its surfaces prior to effecting said plastic flow.

18. A process as claimed in claim 17 wherein said plastic flow is effected by heat and pressure.

19. The method of claim 18 wherein said sheet material is of the character of Kraft liner board paper.

References Cited

UNITED STATES PATENTS

| | | | |
|---|---|---|---|
| 2,205,958 | 6/1940 | McGhee et al. | 8—149.1 |
| 2,243,296 | 5/1941 | Sweetland | 117—152 |
| 2,399,981 | 5/1946 | Britt | 162—181 R |
| 2,399,982 | 5/1946 | Britt | 117—152 |
| 3,485,714 | 12/1969 | White | 162—201 |

WILLIAM J. VAN BALEN, Primary Examiner

C. E. LIPSEY, Assistant Examiner

U.S. Cl. X.R.

117—66, 115, 152; 156—275, 306, 325; 161—210, 156; 264—258, 324